Nov. 25, 1930.  F. N. PAPE  1,782,629
SHIELD FOR MOTOR VEHICLE HEADLIGHTS
Filed Jan. 29, 1929    2 Sheets-Sheet 1
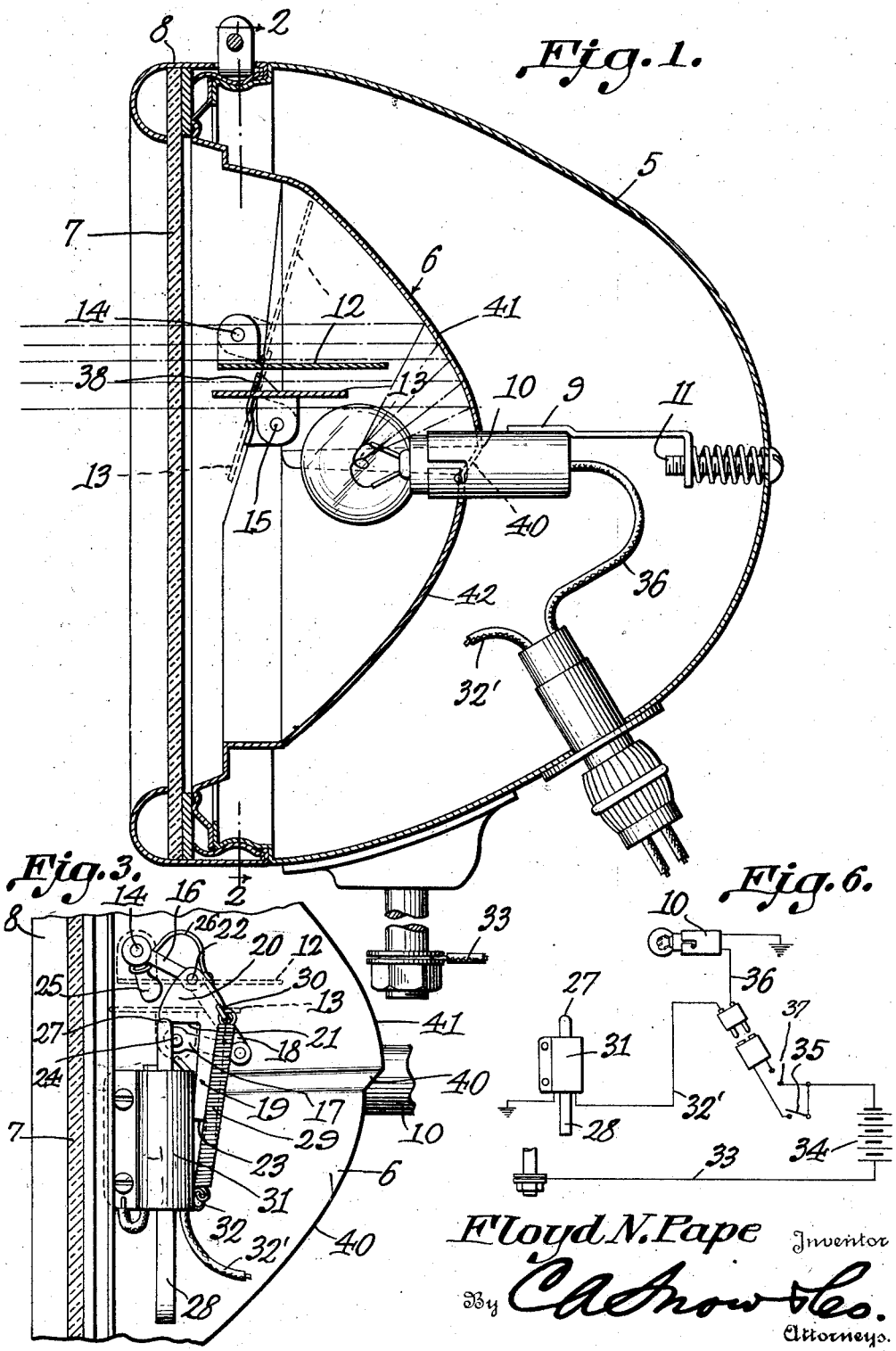

Nov. 25, 1930. F. N. PAPE 1,782,629
SHIELD FOR MOTOR VEHICLE HEADLIGHTS
Filed Jan. 29, 1929 2 Sheets-Sheet 2
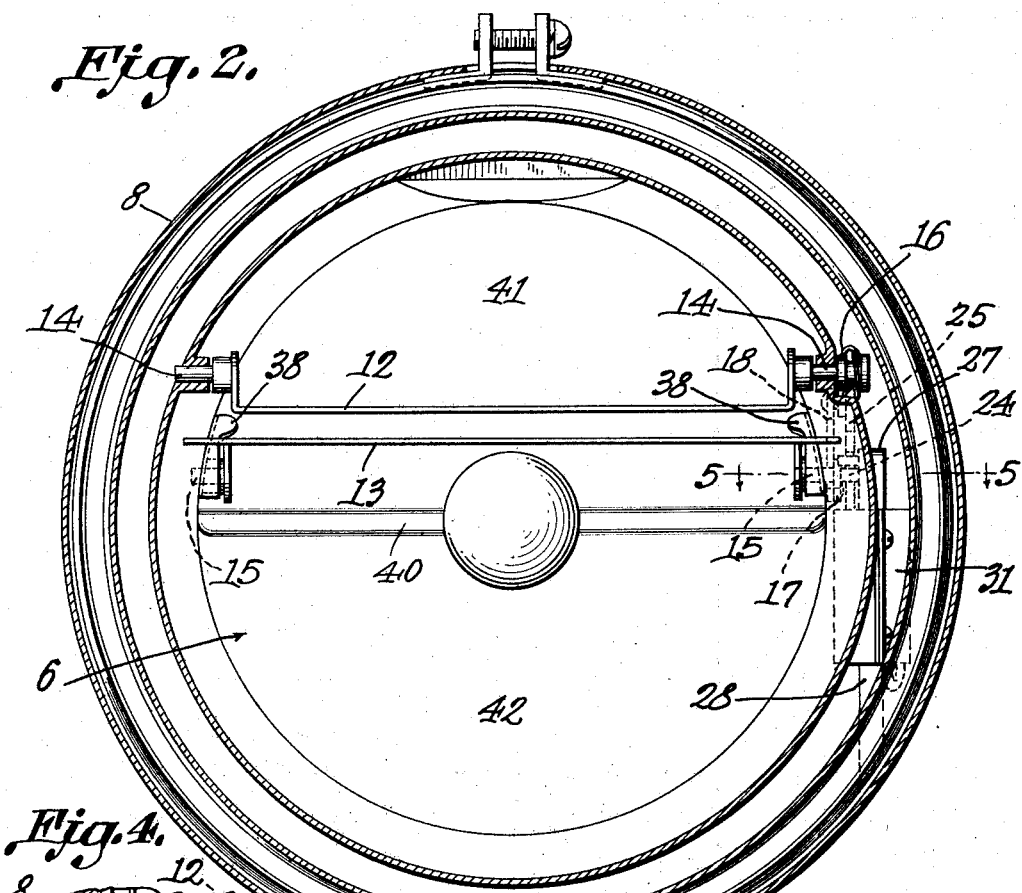
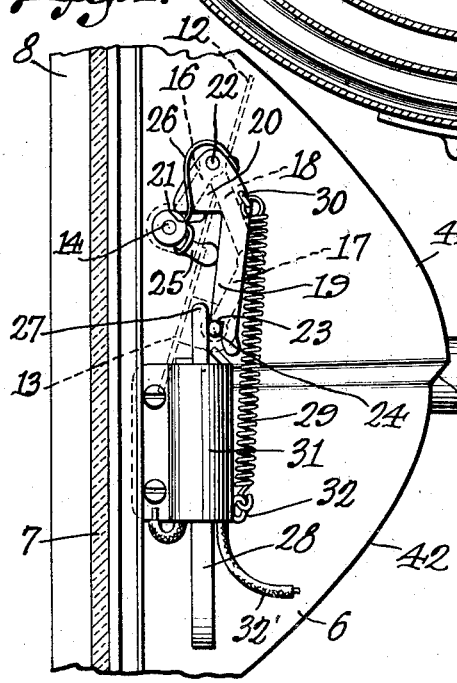
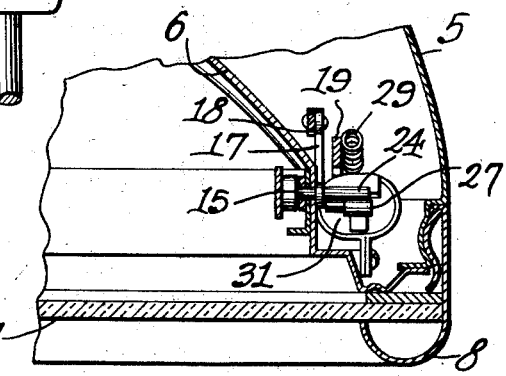
Floyd N. Pape, Inventor
By C. A. Snow & Co., Attorneys

UNITED STATES PATENT OFFICE

FLOYD N. PAPE, OF CLINTON, IOWA

SHIELD FOR MOTOR-VEHICLE HEADLIGHTS

Application filed January 29, 1929. Serial No. 335,820.

This invention relates to a shield or dimmer designed for use in connection with motor vehicle headlights, the primary object of the invention being to provide pivoted blades so constructed and mounted that the upper portion of the headlight equipped with the shield may be shielded confining the light rays to the lower portion of the headlight so that the light rays projected from the headlight will be directed on a line below the line of vision of persons approaching the headlight.

An important object of the invention is to provide pivoted blades of this character which may be operated by a solenoid energized by the operation of a manually controlled switch located in proximity to the driver's seat so that the driver may have ready access thereto.

A further object of the invention is to provide a reflector divided by a transverse offset portion defining an upper reflector section and a lower section, the curvature of the lower section being greater than the curvature of the upper section so that light rays striking the lower section will be directed forwardly and downwardly.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a headlight equipped with a dimmer constructed in accordance with the invention.

Figure 2 is a sectional view taken on line 2—2 of Figure 1.

Figure 3 is a fragmental elevational view illustrating the solenoid and levers for transmitting movement of the blades.

Figure 4 is an elevational view illustrating the solenoid and levers in their positions after they have been operated to move the blades to their active positions.

Figure 5 is a sectional view taken on line 5—5 of Figure 2.

Figure 6 is a diagrammatic view illustrating the circuit to the solenoid.

Referring to the drawings in detail, the reference character 5 designates the body portion of a headlight which is supplied with the reflector 6, lens 7 and lens securing ring 8. This reflector is formed with an offset portion 40 disposed centrally thereof which offset portion defines an upper reflector section 41 and a lower reflector section 42, the lower section being curved to a degree to project light rays forwardly and downwardly, while the upper reflector 41 is curved to project light rays horizontally.

The reference character 9 designates an adjustable bracket to which the lamp socket 10 is secured, the bracket being provided with a threaded opening to receive the adjusting screw 11 that extends through the housing 5 so that upon rotary movement of the screw 11, the bracket 9 may be moved to adjust the lamp socket and lamp supported therein, towards or away from the reflector.

The dimmer embodies an upper blade 12 and a lower blade 13, the upper blade 12 being provided with a curved upper edge so that it will closely fit within the reflector, the upper edge of the blade 13 being extended upwardly an appreciable distance so that the lower edge of the blade 12 will overlap the upper edge of the blade 13.

The blades 12 and 13 are mounted on shafts 14 and 15 respectively, the shaft 14 at one end of the blade 12 being provided with a lever 16 which connects with the arm 17, through the medium of the pivoted connecting link 18 which operates to cause a simultaneous movement of the blades upon movement of the operating arm.

The reference character 19 designates the controlling arm which is formed with an enlarged upper end portion 20 defining a shoulder 21, the arm 19 being pivotally connected to the lever 16 at 22. Formed in the lower end of the arm 19 is a notch defining a shoulder 23 which is adapted to rest against the extension 24 of the shaft 15 at one side of the headlight, so that when the arm 19 is moved to a position to operate the blades 12 and 13 to move them to their shielding positions, the blades will be held in such position until the solenoid, to be hereinafter more fully described, is operated to release the arm 19.

Pivotally connected to the shaft 14 adjacent to the lever 16, is an arm 25 which is normally held into contact with one edge of the arm 19, by means of the spring 26 in which position the arm 25 lies in the path of travel of the upper end 27 of the solenoid core 28.

A coiled spring indicated at 29 has its upper end connected to the arm 19 at 30, the lower end thereof being secured to the solenoid 31 at 32 with the result that the arm 19 is normally held downwardly. Electric energy passes to the solenoid 31 through the wires 32' and 33 which are in circuit with the battery 34 of the motor vehicle, there being provided a switch 35 for controlling the current to the solenoid independently of the light circuit which is indicated at 36, the light circuit being controlled by the switch 37.

The blade 13 is formed with cut out portions adjacent to its ends defining shoulders to move into engagement with ears 38 secured adjacent to the shafts 15 to restrict movement of the blades and hold the blades in their horizontal positions under normal conditions.

The operation of the dimmer is as follows:

Assuming that the blades 12 and 13 are in their inactive positions as shown by Figure 1 of the drawings and it is desired to move the blades to shield the upper section of the headlight, the switch 35 is operated directing current to the solenoid 31 which becomes energized, with the result that the core 28 is attracted, the upper end thereof contacting with the arm 19 forcing it upwardly until the shoulder 23 moves into engagement with the extension 24 of the shaft 15.

When the blades 12 and 13 are moved to their active positions as shown in dotted lines in Figure 1 of the drawings, the light rays striking the inner surfaces of the blades will be directed rearwardly onto the lower section 42 of the reflector, which will direct light rays forwardly upon the road, thereby giving the driver a highly powered driving light and at the same time cutting off the upper portion of the illumination and thus eliminating glare.

The arm 19 is held in this position by the action of the spring 29. Should it be desired to return the blades to their normal positions, the switch 35 is again operated causing the solenoid to attract its core 28, which has fallen to a position as shown by Figure 4. As the core 28 moves upwardly it contacts with the arm 25 moving the arm upwardly, and since the arm 25 is engaging arm 19, the arm 19 is moved laterally disengaging the shoulder 23 and extension 24 allowing the spring 29 to draw the arm 19 downwardly to a position as shown by Figure 3.

I claim:

1. In combination with a headlight, a dimmer including pivoted blades, shafts extending through the side of the headlight, said blades being mounted on the shafts, an extension forming a part of one of the shafts, pivoted links connecting the blades, an arm connected with the links and having a shoulder at its upper end, a solenoid mounted near the arm, the core of said solenoid adapted to move to engage the shoulder to move the arm and links upwardly to operate the blades, said arm having a shoulder at its lower end to engage the extension to hold the arm and blades in their active positions, and means controlled by the action of the solenoid for moving the arm out of engagement with the extension to release the blades.

2. In combination with a headlight, a dimmer including pivoted blades, shafts on which the blades are mounted for pivotal movement, one of said shafts having an extension, links connecting the shafts to rotate the shafts, an arm pivotally connected with the links, a shoulder formed at the lower end of the arm, a solenoid, the core of said solenoid being operable to engage the arm to move the arm upwardly, to move the blades to their closed positions, and to cause the shoulder of the arm to engage the extension, to hold the arm and blades in their closed positions, a pivoted member supported adjacent to the arm and adapted to engage the arm to move the arm laterally out of contact with the extension, to cause the blades to move to their open positions, and said solenoid adapted to engage the pivoted member to operate the pivoted member.

In testimony that I claim the foregoing as my own, I have hereto affixed my signature.

FLOYD N. PAPE.